Feb. 16, 1971 J. V. CULL ET AL 3,564,485

TERMINAL AND TERMINAL BLOCK COVER

Filed Jan. 23, 1969 3 Sheets-Sheet 1

John V. Cull
James D. Crownover
INVENTORS

BY Clarence A. O'Brien
and Harvey B. Jacobson
Attorneys

John V. Cull
James D. Crownover
INVENTORS

BY Clarence A. O'Brien
and Harvey B. Jacobson
Attorneys

TERMINAL AND TERMINAL BLOCK COVER

Filed Jan. 23, 1969 3 Sheets-Sheet 3

John V. Cull
James D. Crownover
INVENTORS

BY Clarence A. O'Brien
and Harvey B. Jacobson
Attorneys

United States Patent Office 3,564,485

Patented Feb. 16, 1971

3,564,485

TERMINAL AND TERMINAL BLOCK COVER

John V. Cull and James D. Crownover, both of 2929
Cedar Springs, Dallas, Tex. 75219

Filed Jan. 23, 1969, Ser. No. 793,419
Int. Cl. H01r 9/00
U.S. Cl. 339—198 11 Claims

ABSTRACT OF THE DISCLOSURE

A protective transparent hinged cover device for covering the terminals on a conventional terminal block such as employed in the central switching stations of telephone systems, telegraph systems, and other communication systems. The protective hinged cover device, or terminal guard, covers the terminals either on the top or on the bottom or both of the terminal blocks in order to prevent solder splash and loose wire scrap or clippings from shorting terminals, prevents the terminals from being bent, protects the hands and arms of persons working in the vicinity of the terminal blocks from injury due to contact with sharp projecting terminals, is installed easily on existing terminal blocks with little or no modification of the terminal blocks and is constructed of transparent heat-resistant material to eliminate fire hazards.

The present invention generally relates to a terminal guard or cover in the form of a protective covering device employed to cover the terminals on a conventional terminal block employed in the central switching station of telephone systems, telegraph systems and other communication systems.

In telephone systems, telegraph systems and other communication systems, the various communication lines are interconnected in the central switching station. The incoming lines are connected to terminal blocks with the lines from switching equipment also being connected to these terminal blocks so that the blocks function to connect the switching equipment to the accompanying lines.

Such terminal blocks are mounted on a frame such that they are end to end and extend for relatively long distances usually in a horizontal plane but sometimes in a vertical plane. The horizontal rows of terminal blocks are placed one row above the other from a point near the floor to a point near the ceiling of the switching room and this arrangement is commonly referred to as a horizontal frame. In a similar manner, a vertical frame may be used in which the vertical frame is made up or termiblocks placed end to end from a point near the floor to a point near the ceiling. The rows of vertical blocks are located close to each other in a manner similar to the horizontal rows of terminal blocks.

Due to the close spacing of the rows of terminal blocks, the terminals on the terminal blocks are subject to being damaged, bent, shorted to adjacent terminals and the wires broken off during periods of workmen's activity around these frames. In addition, many of the terminals have sharp corners, burrs, narrow pointed ends and the like, which frequently cause injury to the workmen's hands, arms, face and eyes.

Accordingly, it is an object of the present invention to provide a terminal guard used singularly on the bottom of a terminal block with a designation strip holder provided which protects the bottom of the terminal block.

Another object of the present invention is to provide a hinged terminal guard covering the top of the terminal block and the bottom of the terminal block singularly or plurality.

Still another object of the present invention is to provide a hinged transparent terminal guard which may vary in shape and size to conform with and be mounted on various types and arrangements of terminal blocks used in the central switching station. Further, the transparent hinged terminal guard may be varied in size, shape and length to fit almost any configuration of terminal blocks including both solder type and wire wrap type terminal blocks.

A further object of the invention is to provide a transparent hinged terminal guard which is hinged toward the front of the terminal block and swings below the terminal block in such a manner as to protect the horizontally mounted terminal block.

A still further object of the present invention is to provide a convenient designation strip holder which is visible with the hinged transparent terminal guard in its normally closed or open position on the terminal block.

Yet a further object of the present invention is to provide a terminal guard or cover which affords maximum protection to the closely spaced terminals on a terminal block thus protecting the terminals from being bent, shorted to adjacent terminals and wires being broken off during periods of workmen activity.

Still another feature of the present invention is to provide a transparent hinged terminal guard used singularly on top of the terminal block and being secured to the terminal block by a portion of the bottom terminal guard forming a locking feature and a designation strip holder.

Still another feature of the present invention is to provide a transparent hinged guard which is simple in construction, easy to install or remove, effective for its particular purposes and relatively inexpensive to manufacture.

Another important object of the present invention is to provide a hinged terminal guard constructed of heat resistant and resilient dielectric material which enables the hinged terminal guard to snap firmly and solidly on existing terminal blocks mounted either horizontally or vertically with little or no modification to the terminal blocks or frames with the hinged terminal guard forming a protective cover in its closed position and preventing solder splash and wire scrap or clippings from falling onto the other terminal blocks by deflecting them into a scrap bag provided therefor or onto the floor.

Another significant object of the present invention is to provide a transparent hinged terminal guard so that the top portion in its open position on a terminal block protects the horizontally mounted block below from falling wire clippings and loose solder by deflecting them into a scrap bag provided or onto the floor.

A further significant object of the present invention is to provide a transparent guard constructed such that the color coded wiring on the terminals of a terminal block can be readily and easily inspected or identified without removing the terminal guard from the terminal block.

Yet another significant object of the present invention is to provide a transparent hinged terminal guard which does not require the use of tools for placement or removal of the locking feature of the hinge portion of the terminal guard.

Another object of the present invention is to provide a transparent hinged terminal guard which does not have an exposed conductive material such as metal clips for holding the guard in position.

Still another object of the present invention is to provide a transparent hinged terminal guard which swings freely upwardly and forwardly toward the front of a horizontally mounted terminal block and downwardly below the front of the terminal block and remains suspended either in a fixed or nonfixed position.

A further object of the present invention is to provide a transparent hinged terminal guard which swings freely outwardly and forwardly toward the front of a vertically mounted terminal block and and remains suspended in a fixed or nonfixed position.

A still further object of the present invention is to provide a top hinged terminal guard which is made of transparent material so that the various markings on a terminal block and the designation strip and the designation strip holder provided, on a terminal block, can be read easily when the top hinged transparent terminal guard is in closed position.

Yet another feature of the present invention is to provide a hinged transparent terminal guard which may be held in a closed position on a terminal block mounted either horizontally or vertically, by a coiled tension spring attached to the top portion of the transparent hinged terminal guard and to the hinged portion of the transparent terminal guard.

Another object of the present invention is to provide a hinged transparent terminal guard which may be held in an open position on a terminal block mounted either horizontally or vertically by a coil tension spring attached to the top portion of the transparent hinged terminal guard and to the hinged portion of the transparent terminal guard.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4, 5:
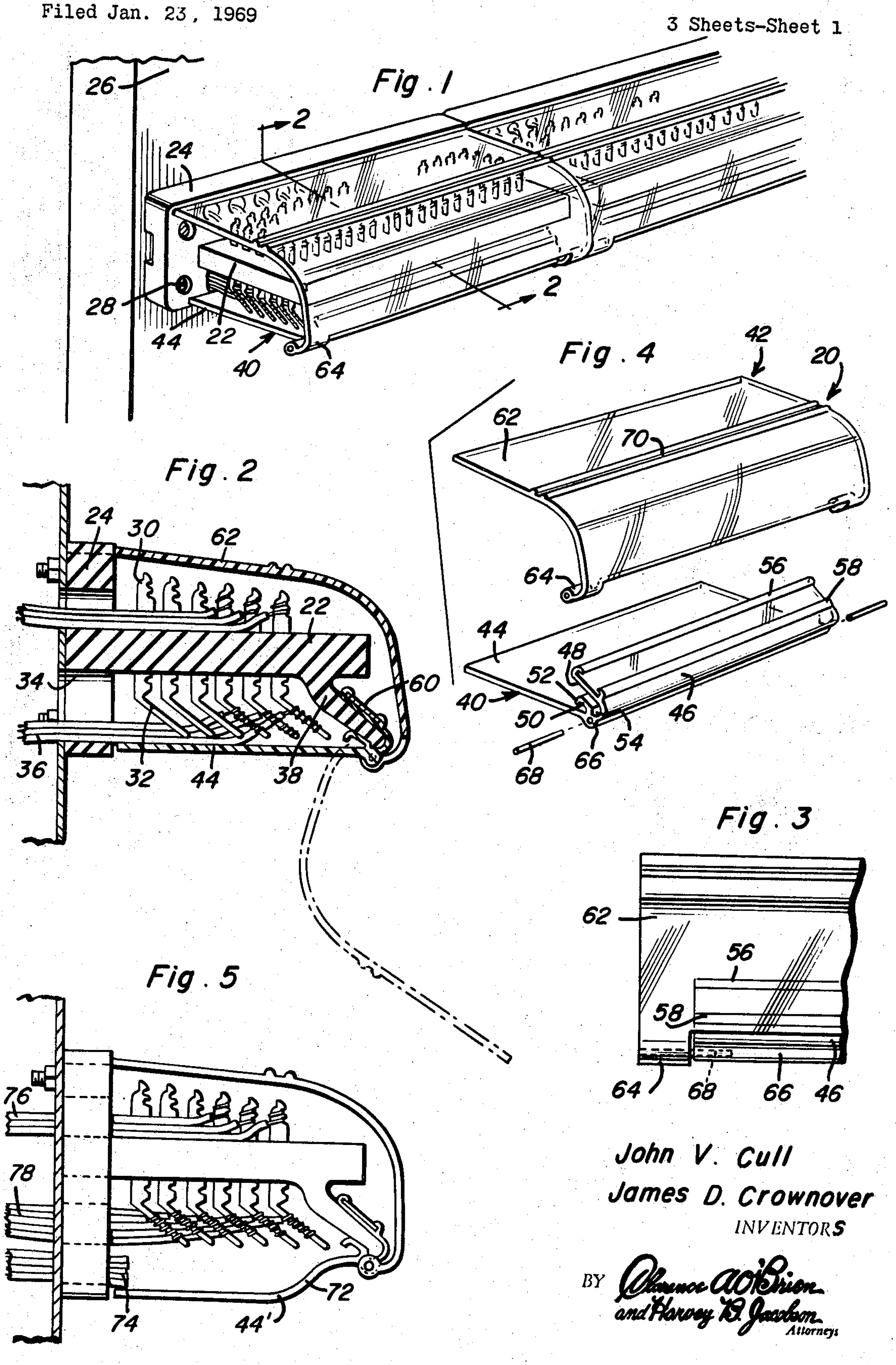
FIG. 1 is a perspective view of the terminal guard or cover of the present invention.
FIG. 2 is a transverse, sectional view taken substantially upon a plane passing along section line 2—2 of FIG. 1 illustrating the relationship of the terminal block, terminals and terminal guard or cover therefor.
FIG. 3 is a front elevational view of a portion of the terminals guard of FIGS. 1 and 2.
FIG. 4 is an exploded group perspective view of the construction illustrated in FIGS. 1–3.
FIG. 5 is a sectional view similar to FIG. 2 but illustrating a modified form of the invention in which the bottom portion of the terminal guard is offset.

Referring now specifically to FIGS. 1–4 of the drawings, the terminal guard, protector or cover is generally designated by the numeral 20 and is mounted on a substantially horizontally disposed terminal block 22 having a vertically disposed base member or mounting member 24 at one end thereof for attachment to a mounting or supporting structure 26 by the use of suitable fasteners 28 or the like all of which represent conventional construction. The terminal block includes terminals 30 extending upwardly therefrom and terminals 32 extending downwardly therefrom with openings 34 being provided for receiving the wires 36 which are connected to the terminals 30 and 32 in a well-known and conventional manner. The lower surface of the terminal block 22 is provided with a depending tongue 38 thereon adjacent the outer edge thereof which normally receives a designation strip or other information relating to the terminal block.

The terminal guard 20 includes a lower stationary bottom member 40 and a pivotally supported upper member or cover 42. The bottom 40 includes a panel 44 which is spaced below the lower terminals 32 with the outer edge of the panel 44 including an upwardly and inwardly curved edge portion 46 terminating in an inwardly and upwardly inclined flange 48. Spaced from the flange 48, the panel 44 is provided with an upwardly and inwardly inclined flange 50 in spaced parallel relation to the flange 48 as illustrated in FIG. 2 for frictionally gripping the top and bottom surfaces of the tongue 38 respectively thus mounting the bottom member 40 in position on the terminal block 22.

The free edge of the flange 50 is provided with a downturned lip 52 which facilitates insertion of the tongue 38 and the opposite or lower edge of the flange 50 is provided with a slight vertical extent 54 conforming in shape and configuration to the free end edge of the tongue 38 for snap-fitting engagement therewith as illustrated in FIG. 2 with the natural resiliency of the plastic material from which the bottom member 40 is formed serving to securely but detachably mount the bottom panel or member 40 in position on the terminal block.

The free edge of the flange 48 is reversely curved as at 56 with the reversely curved edge being disposed in opposed relation to an upwardly projecting flange 58 which faces the flange 56 and defines longitudinal edge slots for receiving slidably the edges of a designation strip 60 which is inserted longitudinally into the recess between the flanges 56 and 58 with the edges thereof received in the facing grooves or channels defined thereby.

The pivotal cover member 42 includes an arcuate panel of transparent plastic material or the like designated by numeral 62 and which includes a pair of inwardly projecting cylindrical and hollow lugs 64 on the lower edge thereof which bridge the edges of the bottom panel 40 for alignment with a corresponding apertured depending lug 66 along the length of the bottom edge of the bottom panel 44 immediately below the recess which receives the tongue as illustrated in FIG. 2. A pivot pin 68 is inserted through the apertured lug 64 and the apertured projection 66 when aligned to pivotally mount the cover member 62 onto the bottom member 40 for pivotal movement from a position overlying the terminals 30 to the depending position as illustrated in broken line in FIG. 2.

The top surface of the hinged panel 62 is provided with a pair of ribs 70 for rigidity and also providing a gripping surface for enabling easy opening of the hinged panel 62. The edges of the bottom panel 44 and the hinged panel 62 are cut to length so that they will substantially abut but be slightly spaced from the face of the mounting plate 24 of the terminal block with the entire structure of the terminal guard being preferably of transparent plastic or equivalent dielectric material. As illustrated in FIG. 2, the curvature and position of the pivot mounting lug 64 is such that the hinged cover panel 62 swings downwardly in such a manner that the inner surface thereof forms somewhat of a protective baffle for underlying terminal blocks so that any wire clippings, solder or the like will be deflected onto the floor or scrap bag provided therefor. Also, as illustrated, the terminal guard protects the cross-connect jumpers and cable jumpers as well as spare wires where they occur.

The structure illustrated in FIG. 5 is similar to the structure illustrated in FIGS. 1–4 except that the bottom panel 44' is offset downwardly as at 72 with this structure being primarily useful where spare pairs of wires 74 are employed along with the usual cross-connect jumpers and cable jumpers as at 76 and 78. The remainder of the structure is the same as that illustrated in FIGS. 1–4 with a slight difference in configuration of the cover panel which may vary depending upon the particular construction of the terminal block.

Figure 6:
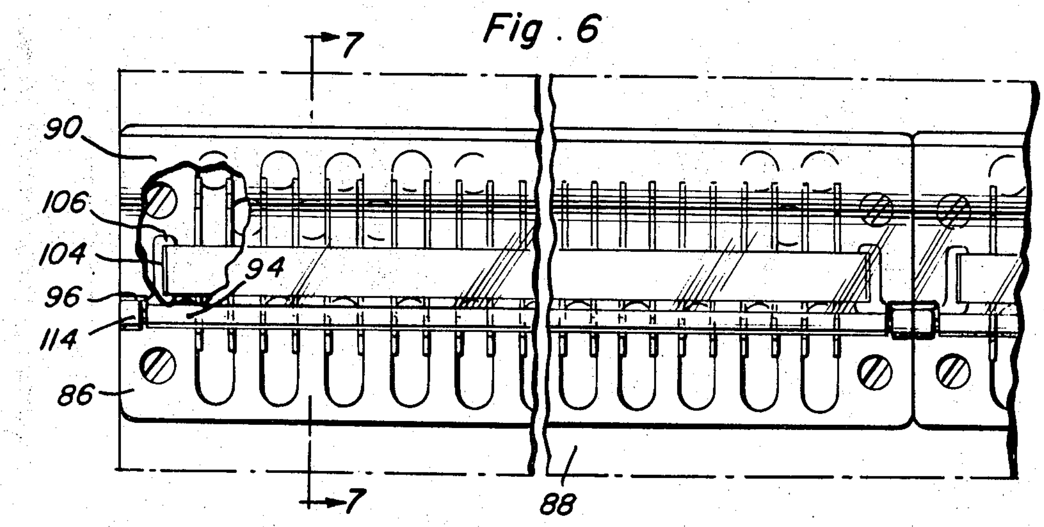
FIG. 6 is a front elevational view illustrating another embodiment of the present invention.
Figures 7, 8, 9, 10:
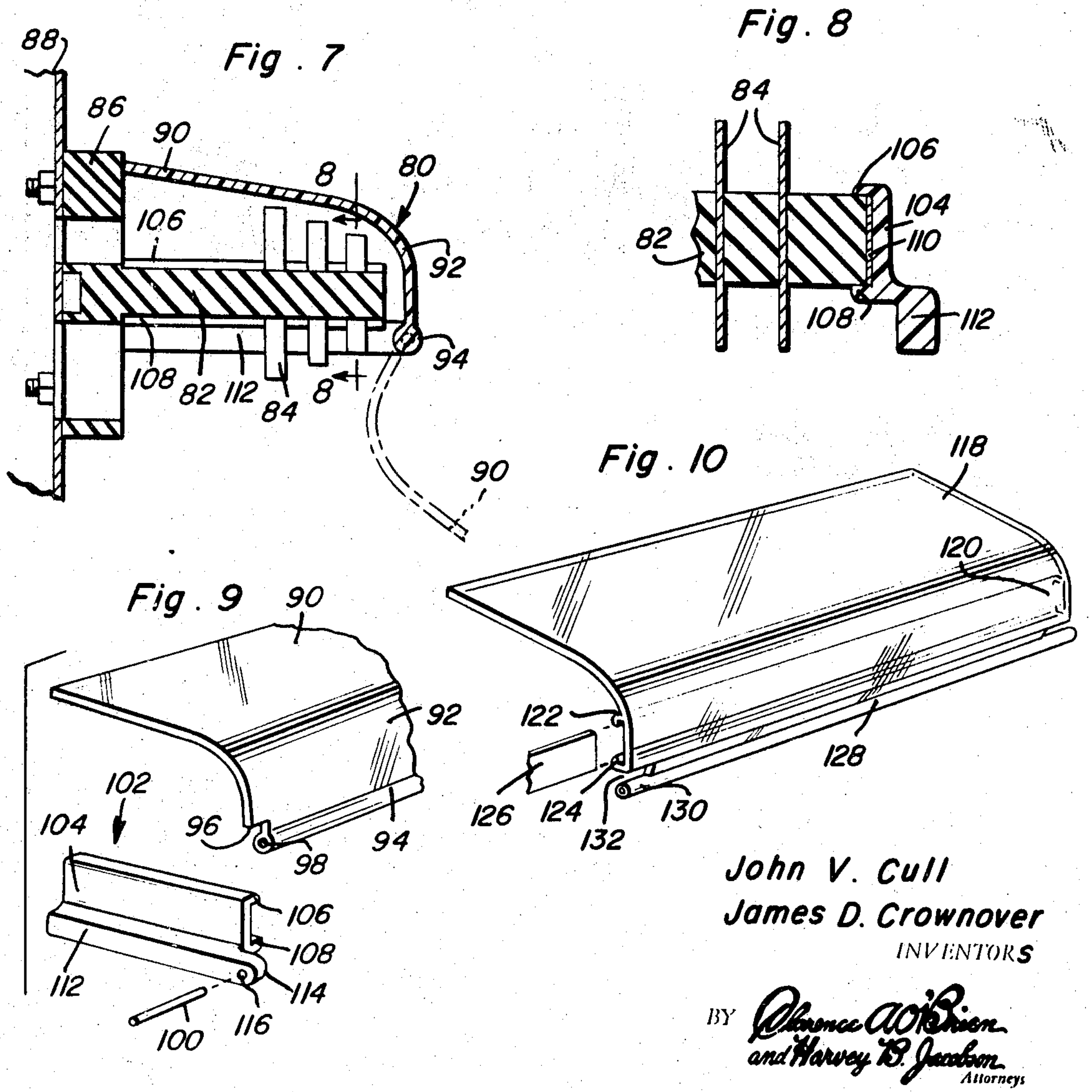
FIG. 7 is a vertical, sectional view taken substantially upon a plane passing along section line 7—7 of FIG. 6 illustrating the structural details of this embodiment of the invention.
FIG. 8 is a detailed, sectional view taken substantially upon a plane passing along section line 8—8 of FIG. 7 illustrating the manner in which this form of the invention is attached to the terminal block.
FIG. 9 is a fragmental group perspective view illustrating the structure of the hinged cover and the mounting structure therefor.
FIG. 10 is a group perspective view illustrating a modified form of the construction of FIG. 9.
Figure 11:
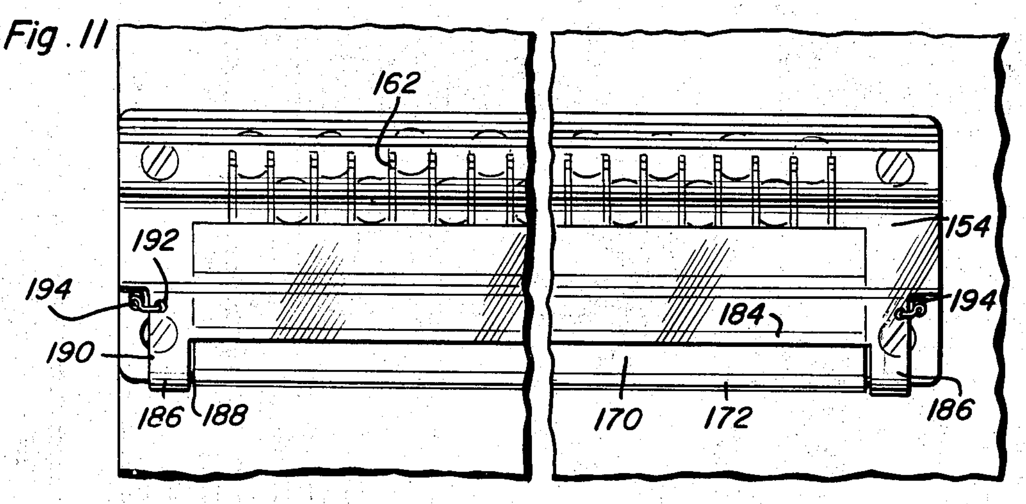
FIG. 11 is a front elevational view of another embodiment of the above invention.

Referring now specifically to FIGS. 6–9 of the drawings, the numeral 80 designates another embodiment of the terminal guard or cover that is specifically adapted for use on terminal blocks 82 having solder type lugs 84 on the top and bottom of the block as illustrated in FIGS. 6–8. The terminal block 82 is provided with the usual mounting block or member 86 and is supported on a vertical support member 88 in a conventional manner.

The terminal guard or cover 80 includes a cover panel 90 having a downwardly curved arcuate front portion 92 terminating in a rib 94 along the lower edge thereof. The lower end corners of the cover panel are provided with notches 96 and the rib 94 includes a bore 98 therein receiving a hinge pin or roll pin 100 for pivotally supporting the cover panel 90 on a mounting bracket generally designated by the numeral 102.

As illustrated in FIGS. 8 and 9, the mounting bracket 102 includes a horizontally disposed plate 104 having laterally extending flanges 106 and 108 along the top and bottom edges thereof which receive the side edge of the terminal block 82 therebetween as illustrated in FIG. 8. A suitable bonding material, adhesive or the like 110 is provided on the inner surface of the plate 104 between the flanges 106 and 108 for mounting and bonding the bracket 102 to a side edge of the terminal block 82 with the outer edge of the channel-shaped member defined by the plate 104 and flanges 106 and 108 terminating substantially flush with the outer edge of the terminal block 82 as illustrated in FIG. 7.

The bonding material 110 may conveniently be a double-sided adhesive tape for bonding the guard hinged bracket to the end of the terminal block and as illustrated in FIG. 6, a bracket 102 is provided at each end of the terminal block. The lower edge of the plate 104 is provided with an outwardly offset rib or flange 112 which extends outwardly beyond the end edge of the plate 104 as illustrated in FIG. 9 with the terminal end of the rib or flange 112 being rounded as at 114 and provided with an aperture 116 therethrough for receiving the hinge pin 100 which is inserted into the bore 98 in the rib 94 thus hingedly supporting the cover panel 90 from the bracket 102. When the cover panel 90 is associated with the bracket 102, the notch construction 96 which receives the projecting end of the rib or flange 112 enables the end edge of the cover panel 90 to be in alignment with the outer surface of the rib 112 so that adjacent terminal blocks may be covered with the end edges of the covers being substantially in abutting engagement as illustrated in FIG. 6 to protect the lugs 84 and thus obtain advantage from all of the previously mentioned advantages and objects.

FIG. 10 illustrates a slightly modified form of cover panel 118 having an arcuate downturned forward portion 120 corresponding to the portion 92 of the panel 90. Disposed on the inner surface of the down-curved forward portion 120 is a pair of inwardly extending flanges 122 and 124 which have their inner edges inturned to form a channel guide for slidably receiving a designation strip 126. Also, in this construction, the rib 128 formed along the bottom edge of the cover panel extends beyond the inner edge of the notch and terminates flush with the end edges of the cover panel 118 with the extension being designated by the numeral 130 and the notch between the extension 130 and the adjacent portion of the cover panel being designated by the numeral 132. This enables a hinged bracket structure to be employed which is not offset from the channel-shaped mounting bracket insofar as lateral direction is concerned with the bracket being effectively beyond the end edges of the cover.

Referring now to FIGS. 11–14, a hinged type terminal guard or cover is designated by the numeral 140 for mounting on a terminal block 142 having terminals 144 thereon and a forwardly and downwardly depending tongue 146 adjacent the forward edge thereof and oriented on the bottom surface thereof. The terminal block 142 is provided with a mounting member 148 and attached to a support structure 150 all in a conventional manner.

Figures 12, 13, 14, 15:
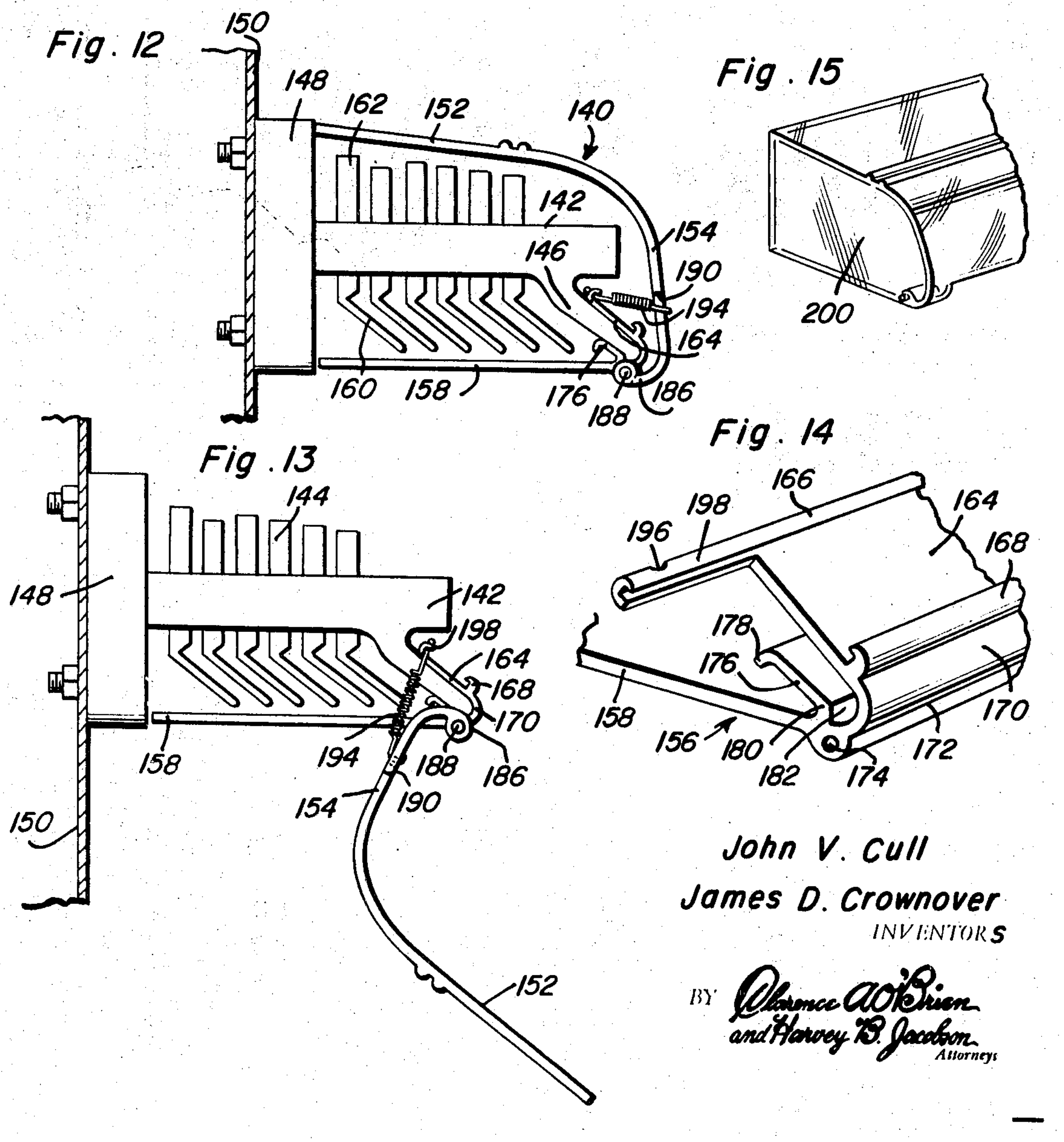
FIG. 12 is an end elevational view of the construction of FIG. 11 illustrating the association of the components when the hinged part of the terminal guard is in closed position.
FIG. 13 is a side elevational view similar to FIG. 12 but illustrating the hinged cover in open position.
FIG. 14 is a fragmental perspective view illustrating the mounting structure for the terminal guard.
FIG. 15 is a fragmental perspective view illustrating an end plate on the terminal guard.

The terminal guard or cover 140 includes a transparent cover panel 152 having a downwardly curved forward portion 154 that is hingedly supported by a hinge structure generally designated by the numeral 156 which includes a bottom panel 158 underlying lower terminals 160 with the cover panel 152 overlying upper terminals 162 as illustrated in FIG. 12.

The hinge structure 156 includes a plate 164 oriented against the upper surface of the tongue 146. The upper edge of the plate 164 is provided with a reversely curved channel-shaped rib or flange 166 thereon and the lower edge of the plate 164 is provided with an upwardly projecting flange 168 having an offset top edge which cooperates with the flange or rib 166 to provide a guide channel for receiving a designation strip (not shown). Extending below the flange 168 is a downwardly and inwardly curved forward edge portion 170 terminating in a longitudinal bottom rib 172 having a bore 174 therein terminating with the end edge thereof. The bottom panel 158 extends inwardly from the inwardly curved portion 170 as well as the rib 172 as illustrated in FIG. 14. Disposed in opposed and substantially parallel relation to the undersurface of the plate 164 is a similar plate 176 which has a downwardly flared upper free edge 178 and the other edge of the plate 176 is integrally formed with the plate 158 by a downwardly offset portion 180 to define a slot-like structure having a downturned recess 182 at the bottom thereof for snap-fitting and frictional engagement with the correspondingly shaped tongue 146. The association of the clamp structure and tongue 146 in FIGS. 11–14 is substantially the same as the hinge mounting structure illustrated in FIGS. 1–5.

The cover 154 includes an elongated notch 184 in the bottom edge thereof with the end edges of the notch being defined by a pair of projecting bosses 186 or the like on the end edges of the cover panel 152 with the bosses 186 having a bore therein in alignment with the bores 174 for receiving a hinge pin 188 as illustrated in FIGS. 12 and 13 so that the cover panel 152 may be hinged from the closed position illustrated in FIG. 12 to the open position illustrated in FIG. 13.

The end edges of the cover panel 152 are provided with a notch 190 in each end edge thereof and an aperture 192 adjacent the upper edge of the notch 190 for receiving one hook end of a coil tension spring 194. The other end of the coil tension spring is received in an aperture 196 formed in an extension 198 of the rib or flange 166 on the plate 164 so that the apertures 196 and 192 are substantially in alignment for receiving the ends of the spring 194 due to the notch 190 and termination of the hinge structure 156 inwardly of the bosses 186, the recess 184 defining the bosses 186 enables the cover 152 to swing from the closed to the open position with the spring passing over the pivot axis of the hinge pin 88 so that the spring 194 will bias the cover panel 152 in the closed position when it reaches a point above the hinge axis 188 as illustrated in FIG. 12 and will bias the cover panel 152 to an open position when it reaches a point below and rearwardly of the hinge axis 188 as illustrated in FIG. 13.

The transparent hinged terminal guard is constructed of a dielectric material such as transparent polyvinyl chloride and may be constructed of any suitable color which in itself may be a color code. This form of the invention is easily installed and requires little or no modification or positive connection with the terminal blocks themselves and provides protection in the same manner as the other forms of the invention. The hinged terminal guard may be used to cover either the top or bottom portion of the terminal blocks plurally and may be attached to vertically or horizontally mounted terminal blocks. The shape, size and configuration of the hinged terminal guard will vary depending upon the terminal block and the region of the terminals thereon and the various terminal guards will quite easily snap into engagement for mounting on the terminal blocks in protective relation to the terminals thereon.

FIG. 15 illustrates the terminal guard structure including a cover plate which has an end closure plate 200 thereon which is especially useful when the terminal guard or cover is used on vertically mounted terminal blocks. The end plate or cover cap may be placed on either end or both ends of the guard and fabricated of the same material and could be employed on any of the protective guards or covers illustrated in the drawings.

The terminal guard of the present invention provides a means for opening the guard and doing repair work without having a loose guard to hold or store until the work is completed and the block recovered by a separate and detachable guard. The hinged terminal guard provides a positive connection with the block and covers the block in its entire length and width and leaves no shelves or other surfaces for solder and wire scraps to collect. Also, the terminal hinged guard is constructed of a semiflexible and self-extinguishing plastic which reduces damage in the event of an electrical fire.

The hinged portion of the transparent terminal guard may be cut off at any desired width or length which makes the bottom cover inexpensive to manufacture since one mold or die can be used to fabricate guards for many different terminal blocks. Also, the hinged portion of the guard permits the top transparent portion to open toward the front of the terminal block as opposed to removable type covers or an arrangement in which the cover would open toward the rear which obstructs activity during repair or the like. A designation strip is provided in a convenient location for observation to enable identification of the terminals on the terminal blocks. The designation strip may be color coded to designate a particular group of terminal blocks, a preprinted designation strip can be provided at the time of manufacture of the terminal guard or may be added at a later time by field or maintenance personnel. The designation strip provides a clear, simple, quick and inexpensive method of identification thus eliminating rather expensive, hand stenciled identification markings which are usually poorly done and which are currently used on terminal blocks. Further, the designation strip is easily and quickly changed which replaces the difficult, costly and time-consuming method of removing the hand-stenciled designations. The hinged portion of the transparent terminal guards may be cut so that the bottom terminals of the terminal block are exposed if desired. The top portion of the guard may be cut off at any desired width or length which makes the top cover a relatively inexpensive item to manufacture in the same manner that the hinged portion thereof is inexpensive inasmuch as a single die or mold may be employed. The hinged portion of the transparent terminal guard also may be removed from the terminal block without the use of tools such as pliers, screw drivers or the like which are now required to remove conventional guards and no exposed conductive materials such as metal clips are employed such as are used on conventional guards now in use. The addition of the spring to the top portion of the terminal guard enables the top portion to be held in a closed or in an open position regardless of whether the guard is mounted on a horizontal or vertical terminal block arrangement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. In combination with a terminal block having projecting terminals thereon employed in a switching station of a communications system, a protective guard for the terminals comprising a supporting member connected with the terminal block, a hinged cover protectively overlying the terminals on the terminal block, and means hingedly attaching the cover to the supporting member for pivoting movement of the cover from a protective position to a position enabling access to the terminals on the terminal block, said supporting member including a channel-shaped clip defined by spaced parallel plates frictionally engaging a projecting tongue on the terminal block for releaseably securing the supporting member thereon.

2. The structure as defined in claim 1 together with a bottom panel integral with the clip and extending into underlying relation to terminals on the bottom of the terminal block.

3. The structure as defined in claim 2 wherein said bottom panel includes a downwardly offset portion to enable additional wires to be received thereabove.

4. In combination with a terminal block having projecting terminals thereon employed in a switching station of a communications system, a protective guard for the terminals comprising a supporting member connected with the terminal block, a hinged cover protectively overlying the terminals on the terminal block, and means hingedly attaching the cover to the supporting member for pivoting movement of the cover from a protective position to a position enabling access to the terminals on the terminal block, supporting member including a pair of elongated channel-shaped brackets each including inwardly extending flanges adapted to receive the end edge of the terminal block, and means securing the channel-shaped bracket to the end edge of the terminal block.

5. The structure as defined in claim 4 wherein said bracket includes a projecting boss, said cover including a rib along one edge thereof including a bore therein aligned with the boss, and a hinge pin extending through the boss and into the rib and forming said means hingedly attaching the cover to the supporting member.

6. The structure as defined in a claim 5 wherein said boss is offset laterally outwardly from the bracket, said cover including a notch therein whereby the end edge of the cover and boss are substantially flush to enable a plurality of covers to be mounted on a plurality of aligned terminal blocks in substantially abutting engagement.

7. The structure as defined in defined in claim 4 in which the cover is constructed of transparent material, the inner surface of said cover including opposed channels forming a guide for receiving a designation strip.

8. In combination with a terminal block having projecting terminals thereon employed in a switching station of a communications system, a protective guard for the terminals comprising a supporting member connected with the terminal block, a hinged cover protectively overlying the terminals on the terminal block, and means hingedly attaching the cover to the supporting member for pivoting movement of the cover from a protective position to a position enabling access to the terminals on the terminal block, and spring means interconnecting the supporting member and cover to bias the cover toward a protective position and an access position.

9. The structure as defined in claim 8 wherein said spring means includes a tension coil spring extending between the supporting member and the cover in spaced relation to the means hingedly attaching the cover to the supporting member with the point of connection between the spring and cover shifting over the pivot axis between the cover and supporting member during movement between the protective position and access position of the cover thereby providing an over-center spring to bias the cover to both of its positions.

10. In combination with a terminal block having projecting terminals thereon employed in a switching station of a communications system, a protective guard for the terminals comprising a supporting member connected with the terminal block, a hinged cover protectively overlying the terminals on the terminal block, and means hingedly attaching the cover to the supporting member for pivoting movement of the cover from a protective position to a position enabling access to the terminals on the terminal block, said cover being of arcuate construction and an end plate on at least one end of the cover for protecting the end portion of the terminal block.

11. In combination with a terminal block having projecting terminals thereon employed in a switching station of a communications system, a protective guard for the terminals comprising a supporting member connected with the terminal block, a hinged cover protectively overlying the terminals on the terminal block, and means hingedly attaching the cover to the supporting member for pivoting movement of the cover from a protective position to a position enabling access to the terminals on the terminal block, said supporting member including a plate having opposed channels thereon receiving a designation strip, said cover overlying the designation strip and being of transparent material.

References Cited

UNITED STATES PATENTS

| | | | |
|---|---|---|---|
| 1,659,303 | 2/1928 | Rovere | 339—198.2X |
| 2,178,092 | 10/1939 | Werner | 339—198.2 |
| 2,588,635 | 3/1952 | Junkin | 40—16.2 |
| 2,671,888 | 3/1954 | Hadden et al. | 339—198.2 |
| 3,329,927 | 7/1967 | Ayers | 339—198.2 |

LARAMIE E. ASKIN, Primary Examiner

D. A. TONE, Assistant Examiner

U.S. Cl. X.R.

174—138; 339—36